US007778285B2

(12) United States Patent
Bleisteiner et al.

(10) Patent No.: US 7,778,285 B2
(45) Date of Patent: Aug. 17, 2010

(54) METHOD AND APPARATUS FOR EXTRACTION AND INSERTION OF PLESIOCHRONOUS OVERHEAD DATA

(75) Inventors: Bernd M. Bleisteiner, Fuerth (DE); Bertram T. Nuetzel, Hersbruck (DE); Miguel Robledo, Nuremberg (DE); Wolfgang Rupprecht, Igensdorf (DE); Martin Saeger, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1341 days.

(21) Appl. No.: 10/954,034

(22) Filed: Sep. 29, 2004

(65) Prior Publication Data

US 2006/0067313 A1 Mar. 30, 2006

(51) Int. Cl.
*H04J 3/06* (2006.01)

(52) U.S. Cl. .................. 370/509; 370/516; 370/518; 370/907

(58) Field of Classification Search .................. None
See application file for complete search history.

(56) References Cited

U.S. PATENT DOCUMENTS

| | | | | |
|---|---|---|---|---|
| 5,796,796 A * | 8/1998 | Wang | ........................ | 375/372 |
| 5,815,504 A * | 9/1998 | Doi | ........................ | 370/503 |
| 6,128,321 A * | 10/2000 | Bennett et al. | ........................ | 370/535 |
| 6,396,853 B1* | 5/2002 | Humphrey et al. | ........................ | 370/535 |
| 6,519,722 B1* | 2/2003 | Wiggins | ........................ | 714/707 |
| 6,577,693 B1* | 6/2003 | Wolf | ........................ | 375/372 |
| 6,633,584 B1* | 10/2003 | Russell et al. | ........................ | 370/466 |
| 6,870,856 B1* | 3/2005 | Schroth | ........................ | 370/466 |
| 7,272,116 B1* | 9/2007 | Houchen | ........................ | 370/258 |
| 7,289,538 B1* | 10/2007 | Paradise et al. | ........................ | 370/497 |
| 7,315,546 B2* | 1/2008 | Repko et al. | ........................ | 370/395.62 |
| 7,613,212 B1* | 11/2009 | Raz et al. | ........................ | 370/510 |
| 2002/0172225 A1* | 11/2002 | Ang et al. | ........................ | 370/503 |

OTHER PUBLICATIONS

G. Barlow, "A G.709 Optical Transport Network Tutorial," http://www.innocor.com/pdf_files/g709_tutorial.pdf, Sep. 26, 2004.
"An Overview of ITU-T G.709," Application Note: 1379, Agilent Technologies, http://cp.literature.agilent.com/litweb/pdf/5988-3655EN.pdf, Mar. 21, 2004.

* cited by examiner

*Primary Examiner*—Michael J Moore, Jr.
(74) *Attorney, Agent, or Firm*—Wall & Tong, LLP (57) ABSTRACT

The invention comprises a method and apparatus for adapting plesiochronous hierarchical layered data to produce synchronous hierarchical layered data. Similarly, the invention comprises a method and apparatus for adapting synchronous hierarchical layered data to produce plesiochronous hierarchical layered data.

21 Claims, 7 Drawing Sheets

FIRST OVERHEAD DATA PACKET HEADER BYTE 702

| ALARM INDICATION SIGNAL BIT 712 | VALID DATA INDICATOR BIT 710 | UNUSED BITS 708 | | DIRECTIONAL INDICATOR BITS 706 | | PARITY BIT 704 |
|---|---|---|---|---|---|---|
| BIT 7 | BIT 6 | BIT 5 | BIT 4 | BIT 3 | BIT 2 BIT 1 | BIT 0 |

SECOND OVERHEAD DATA PACKET HEADER BYTE 714

| PLESIOCHRONOUS DATA STREAM NUMBER BITS 720 | | ALIGNED DATA FRAME ROW NUMBER BITS 718 | | CHANNEL NUMBER BITS 716 | | | |
|---|---|---|---|---|---|---|---|
| BIT 7 | BIT 6 | BIT 5 | BIT 4 | BIT 3 | BIT 2 | BIT 1 | BIT 0 | ial layered data to produce plesiochronous hierarchical layered data in one embodiment comprises buffering synchronous data comprising a plurality of hierarchical layers and applying at least one clock signal to the plurality of hierarchical layers of the buffered synchronous data for producing the plesiochronous hierarchical layered data.

METHOD AND APPARATUS FOR EXTRACTION AND INSERTION OF PLESIOCHRONOUS OVERHEAD DATA

FIELD OF THE INVENTION

The invention relates to the field of optical transport networks and, more specifically, to overhead extraction and insertion in optical transport networks.

BACKGROUND OF THE INVENTION

In order to satisfy growing demand for bandwidth, control costs and still remain competitive, service providers are rapidly deploying the next generation of optical transport networks. As such, network manufacturers must ensure that the optical switches manufactured for use in optical transport networks are fully compliant with the ITU-T G.709 standard. The ITU-T G.709 standard defines the network interface for the transport of voice and data over the high-speed optical transport networks, which is defined in the ITU-T G.872 standard.

In many telecommunications systems, including optical transport networks as specified by ITU-T G.709, overhead information is used to transport system administrative information, such as configuration, management, address, timing, alarm indication and data integrity information, as well as other information. In many networks, including optical transport networks, this overhead information is transported as a portion of a data transmission frame.

In general, due to time division multiplexing techniques, many hierarchical layers of data, each having associated overhead data, can be present in a single high-rate data signal. Unfortunately, each of the hierarchical layers, and therefore their associated overhead, may have timing that is based on different clock frequencies, resulting in completely uncorrelated frequencies within a single data stream. This plesiochronous nature of the multiplexed hierarchical layers makes it extremely difficult to extract and insert overhead in a manner that is not costly.

Since the data streams that are multiplexed for transport across the optical transport networks as defined in the ITU-T G.709 standard may have different clock frequencies, overhead insertion and extraction must be supported for plesiochronous data streams. Since existing overhead extraction and insertion methods are based on processing of synchronous data streams, however, a new method of extracting and inserting the overhead data of plesiochronous data streams is required.

SUMMARY OF THE INVENTION

Various deficiencies in the art are addressed by the present invention of a method and apparatus for adapting plesiochronous hierarchical layered data to produce synchronous hierarchical layered data. Specifically, a method of adapting plesiochronous hierarchical layered data to produce synchronous hierarchical layered data in one embodiment comprises buffering plesiochronous data comprising a plurality of hierarchical layers and applying at least one clock signal to the plurality of hierarchical layers of the buffered plesiochronous data for producing the synchronous hierarchical layered data.

Another embodiment of the invention comprises a method and apparatus for adapting synchronous hierarchical layered data to produce plesiochronous hierarchical layered data. Specifically, a method of adapting synchronous hierarchical

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

The invention is primarily discussed within the context of an optical transport network; however, the methodology of the invention can readily be applied to other networks and network topologies requiring conversion between plesiochronous and synchronous data streams. The invention is illustratively discussed with respect to data streams having multiple hierarchical layers, common in optical transport networks in which a plurality of optical signal rates are transported in a single data stream.

Figure 1:
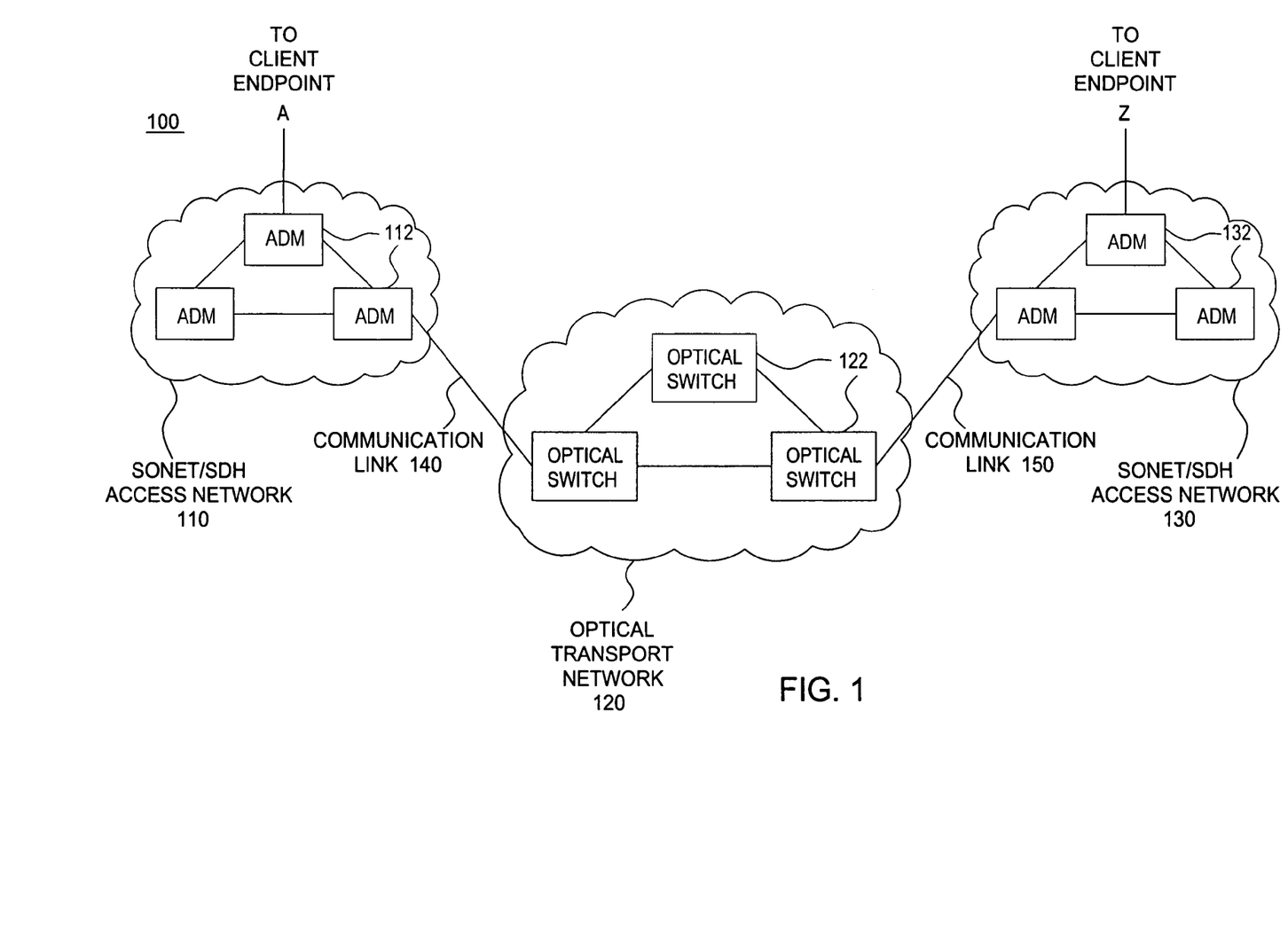
FIG. 1 depicts a high level block diagram of an optical transport network.

FIG. 1 depicts a high level block diagram of an optical transport network. Specifically, the optical transport network 100 of FIG. 1 comprises a first SONET/SDH access sub-network 110 having a first plurality of add-drop multiplexers 112, an optical transport network 120 having a plurality of optical switches 122 and a second SONET/SDH access sub-network 130 having a second plurality of add-drop multiplexers 132.

The first SONET/SDH access sub-network 110 communicates with the optical transport network 120 via at least one communication link 140. Similarly, the second SONET/SDH access sub-network 130 communicates with the optical transport network 120 via at least one communication link 150. The communication link 140 and communication link 150 are any links suitable for enabling communication between optical sub-networks and optical transport networks, and between the network elements of optical sub-networks and optical transport networks.

The first plurality of add-drop multiplexers 112 and the second plurality of add-drop multiplexers 132 provide optical access points for a plurality of client endpoints, such as client endpoint A and client endpoint Z, respectively, as depicted in FIG. 1. Although not depicted in FIG. 1, it is well known in the art that there may be numerous network elements between each of the client endpoints and the first plurality of add-drop multiplexers 112. Similarly, although not depicted in FIG. 1, it is well known in the art that there may be numerous network elements between each of the client endpoints and the second plurality of add-drop multiplexers 132.

Figure 2:
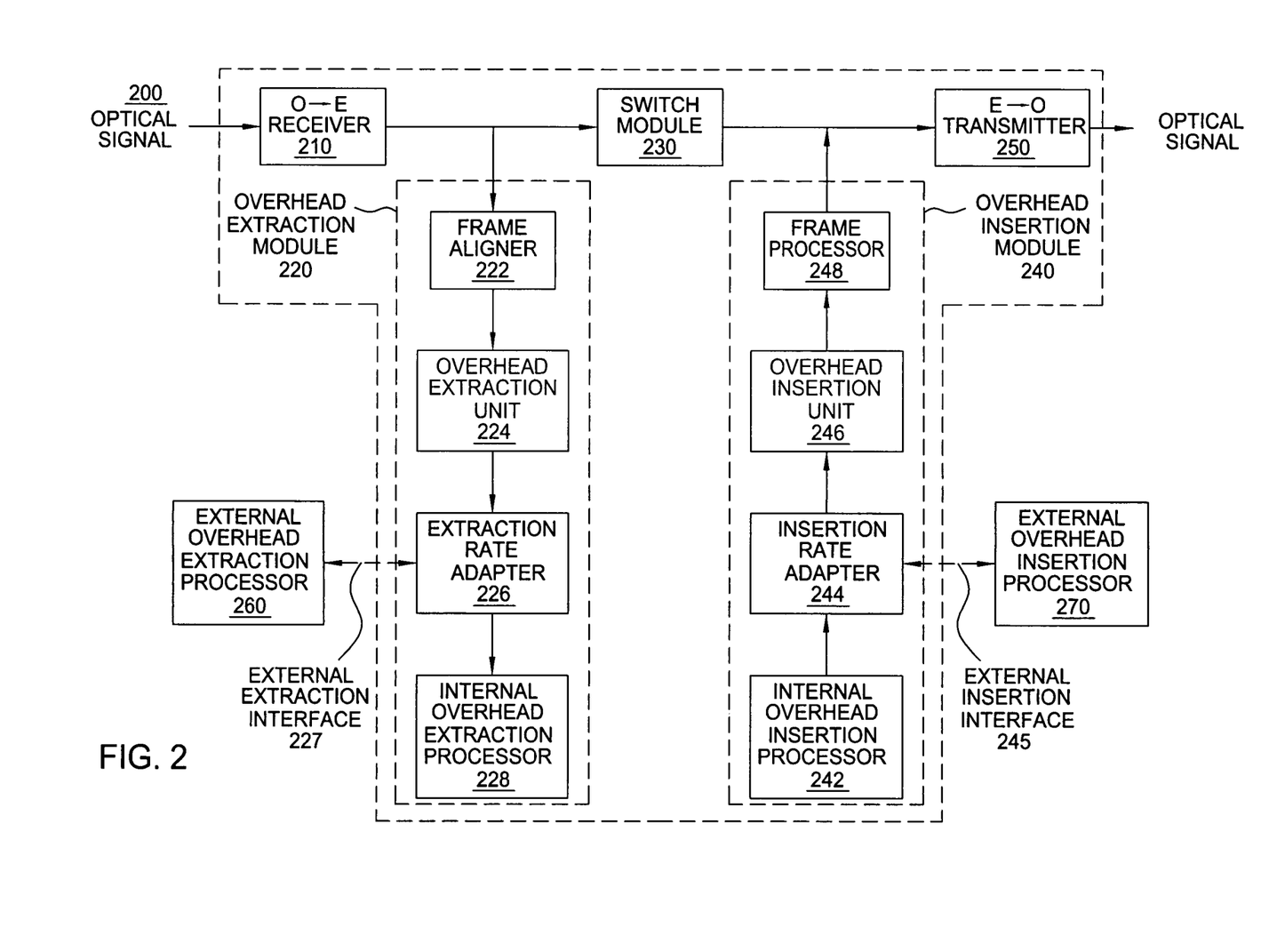
FIG. 2 depicts a high level block diagram of one of the optical switches of the optical transport network of FIG. 1.

FIG. 2 depicts a high level block diagram of an optical switch suitable for use in the optical network of FIG. 1 for use in switching optical signals and processing the associated optical transmission unit, optical data unit and optical path unit overhead data. Specifically, the optical switch 200 of FIG. 2 comprises an optical-electrical receiver 210, an overhead extraction module 220, a switching module 230, an overhead insertion module 240 and an electrical-optical transmitter 250.

The optical-electrical receiver 210 receives optical signals from an optical network element in the optical transport network 120, and converts the optical signals into corresponding electrical signals. The optical signals, and the corresponding electrical signals, include any information suitable for transport across optical networks, as well as associated overhead data useful in routing the data across the network, providing error correction functions, and the like.

The output of optical-electrical receiver 210 is coupled to both the input of the overhead extraction module 220 and to the input of the switching module 230. As such, the electrical signals produced by the optical-electrical receiver 210 are transmitted to the both the overhead extraction module 220 and the switching module 230.

The overhead extraction module 220 comprises a frame aligner 222, an overhead extraction unit 224, an extraction rate adapter 226 and an internal overhead extraction processor 228. The frame aligner 222 receives the electrical signals from the optical-electrical receiver 210.

Figure 5:
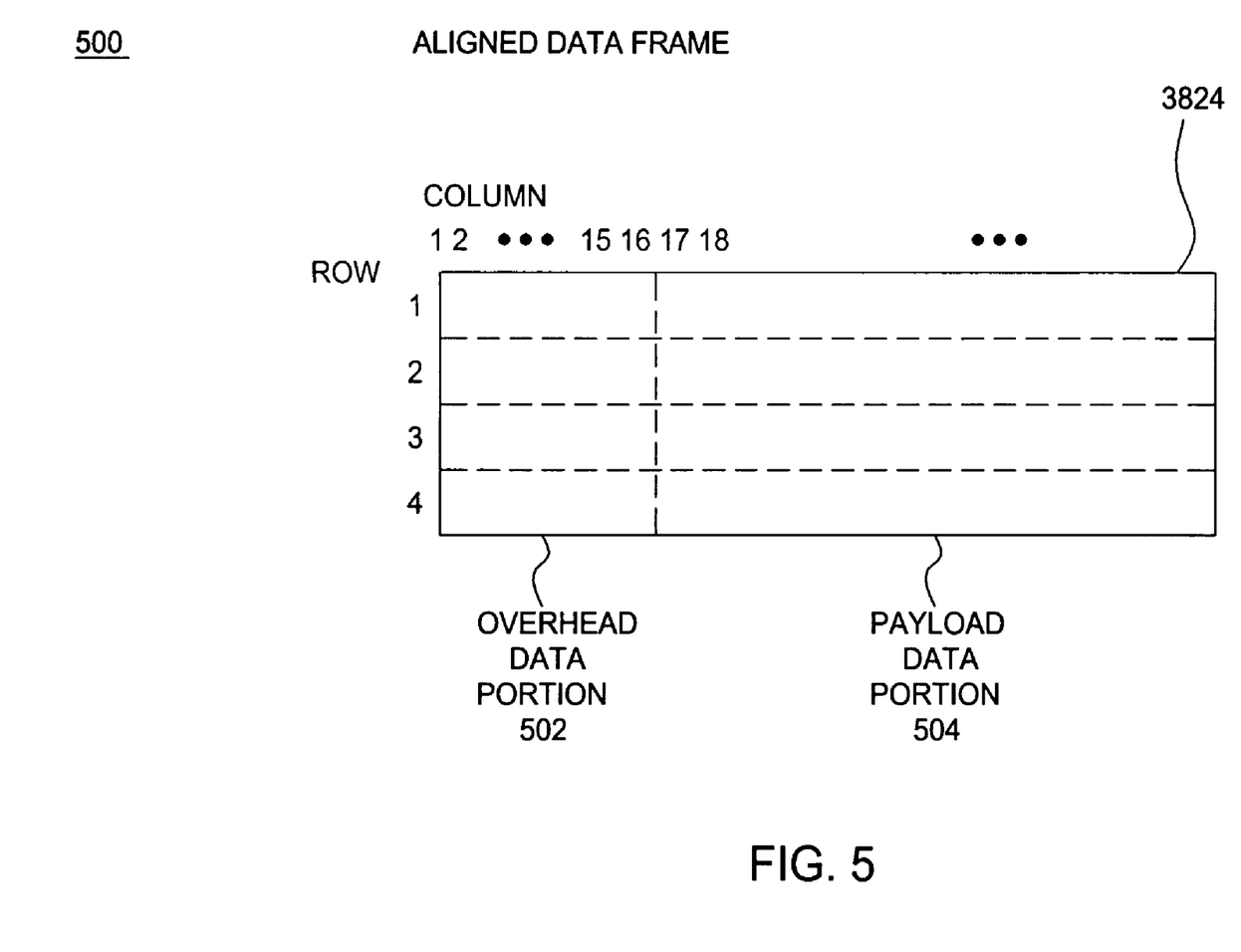
FIG. 5 depicts the data structure and contents of an aligned data frame.

The frame aligner 222 processes the received electrical signals in order to align the data represented as electrical signals into corresponding aligned data frames. The alignment processing is typically performed using a frame alignment signal and a plurality of pointers to mark the external block boundaries of the aligned data frame, as well as the internal block boundaries of different portions of data within the aligned data frames. The structure of a resulting aligned data frame output from the frame aligner 222 is depicted in FIG. 5. As described herein, an aligned data frame comprises an overhead portion and a payload portion and, optionally, a forward error correction portion.

Figure 6:
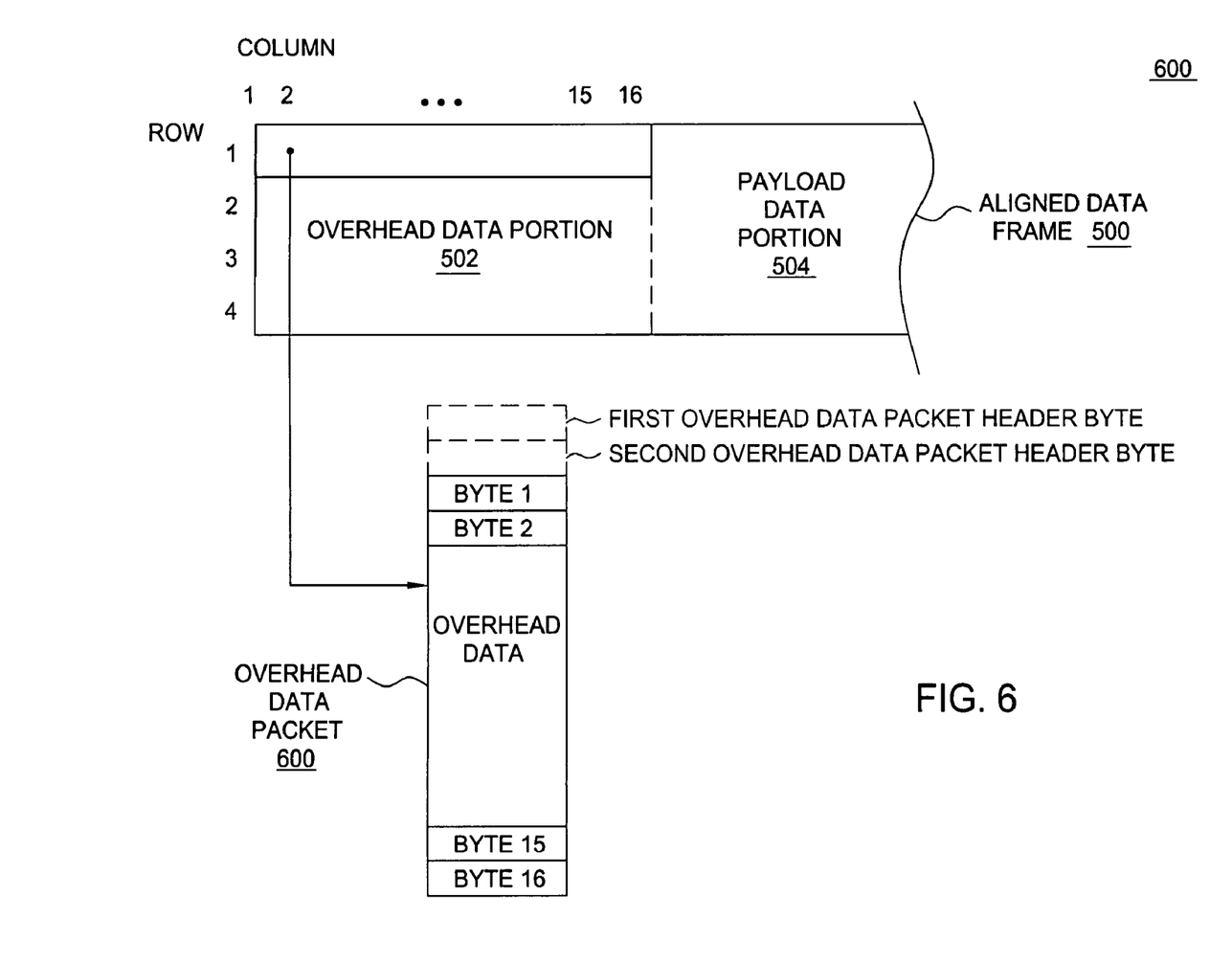
FIG. 6 depicts the data structure and contents of an overhead data packet.

The frame aligner 222 transmits the aligned data frames to the overhead extraction unit 224. The overhead extraction unit 224 receives the aligned data frames from the frame aligner 222, and uses a plurality of pointers to extract the overhead portion of each aligned data frame. The overhead extraction unit 224 extracts the overhead bytes row-by-row, creating a sixteen-byte overhead data packet for each row extracted. The structure and contents of the sixteen-byte overhead data packet that is output from the overhead extraction unit 224 is depicted in FIG. 6 and described herein.

The output of overhead extraction unit 224 is coupled to the input of the extraction rate adapter 226. The overhead extraction unit 224 transmits each overhead data packet to the extraction rate adapter 226 with an accompanying pulse that indicates that the sixteen-byte overhead data packet is available (two bits are sent to identify the aligned data frame row). Since a plurality of data hierarchies having varying data rates are received and processed by the optical switch 200, the overhead data packets are transmitted to the extraction rate adapter 226 as plesiochronous overhead data having a plurality of different data rates and associated clock frequencies.

The extraction rate adapter 226 receives the plesiochronous overhead data from the overhead extraction unit 224 as a stream of plesiochronous overhead data, and converts the plesiochronous overhead data into synchronous overhead data. The output of the extraction rate adapter 226 is coupled to the input of the internal overhead extraction processor 228. The extraction rate adapter 226 transmits the synchronous overhead data to the internal overhead extraction processor 228 for processing.

In one embodiment, the output of extraction rate adapter 226 is optionally coupled to an external overhead extraction processor 260. In this embodiment, the extraction rate adapter 226 transmits the synchronous overhead data to the external overhead extraction processor 260 in order to enable additional processing on the extracted overhead data.

In one embodiment, due to the multiplexed nature of the plesiochronous hierarchical layered data, optical-electrical receiver 210 feeds a plurality of frame aligners, which in turn feed a corresponding plurality of overhead extraction units. In this embodiment, each hierarchical layer of plesiochronous hierarchical layered data is fed into a different frame aligner. The output from each of the frame aligners is then fed into the input of each of the corresponding overhead extraction units. In this embodiment, each of the overhead extraction units feed the plesiochronous overhead data into extraction rate adapter 226.

In another embodiment, a plurality of extraction rate adapters and an associated multiplexer are used in order to convert plesiochronous hierarchical layered data into synchronous hierarchical layered data. In this embodiment, a separate extraction rate adapter is used to adapt the rate of the overhead data associated with each layer of the plesiochronous hierarchical layered data stream. The resulting synchronous hierarchical layered data streams are then multiplexed for transmission towards at least one of the internal overhead extraction processor 228 and the external overhead extraction processor 260.

As described hereinabove, the switching module 230 receives electrical signals from the output of optical-electrical receiver 210. The switching module 230 processes the electrical signals in order to route the data streams towards the correct output port of the optical switch. The switching of data streams by the switching module 130 is well known in the art. The output of the switching module 130, switched electrical signals representing the data transported over the optical switch, are directed to the input of the electrical-optical transmitter 250.

The overhead insertion module 240 comprises an internal overhead insertion processor 242, an insertion rate adapter 244, an overhead insertion unit 246 and a frame processor 248. The internal overhead insertion processor 242 performs processing in order to determine and generate the required overhead data to be wrapped around the payload data transmitted by the electrical-optical transmitter 250. The internal overhead insertion processor 242 performs frame generation. In one embodiment, a separate frame generator (not depicted) may be coupled to the internal overhead insertion processor 242 for performing frame generation. The internal overhead insertion processor 242 transmits generated overhead data packets to the insertion rate adapter 244 as synchronous overhead data.

Although in one embodiment the overhead data packet generated by the internal overhead insertion processor 242 is a sixteen-byte overhead data packet, the invention is described with respect to an embodiment in which the generated overhead data packet is an eighteen-byte overhead data packet. The structure and contents of the overhead data packet that is output from the internal overhead insertion processor 242 is depicted in FIG. 6 and described herein below.

The insertion rate adapter 244 receives eighteen-byte overhead data packets from the internal overhead insertion processor 242 as synchronous overhead data and converts the synchronous overhead data into plesiochronous overhead data. The output of the insertion rate adapter 244 is coupled to the input of the overhead insertion unit 246. The insertion rate adapter 244 transmits the plesiochronous overhead data to the overhead insertion unit 246.

In one embodiment, the insertion rate adapter 244 is optionally coupled to an external overhead insertion processor 270. In this embodiment, the insertion rate adapter 244 receives additional overhead data from the external overhead insertion processor 270. The insertion rate adapter 244 converts the synchronous overhead data into plesiochronous overhead data and transmits the plesiochronous overhead data to the overhead insertion unit 246.

The overhead insertion unit 246 receives plesiochronous overhead data from the insertion rate adapter 244. The overhead insertion unit 246 uses a plurality of pointers to insert the plesiochronous overhead data into specific positions within the overhead data portion of the aligned data frame for which the overhead data is intended. The overhead insertion unit 246 then transmits the aligned data frames, including overhead data, to the frame processor 248.

The frame processor 248 receives the aligned data frames, including overhead data, with plesiochronous timing from the overhead insertion unit 246. The frame processor 248 processes the frames (serially, row-by-row, beginning at the top-left, first-row of an aligned data frame) in order to convert the frames into corresponding electrical signals. The corresponding electrical signals are then combined with the switched data from the output of the switching module 230 and transmitted to the electrical-optical transmitter 250.

In one embodiment, due to the multiplexed nature of the plesiochronous hierarchical layered data, insertion rate adapter 244 feeds a plurality of overhead insertion units, which in turn feed a corresponding plurality of frame processors. In this embodiment, each hierarchical layer of plesiochronous hierarchical layered data is fed into a different overhead insertion unit. The output from each overhead insertion unit is then fed into the input of each of the corresponding frame processors. In this embodiment, each frame processor feeds the plesiochronous overhead data towards electrical-optical transmitter 250.

The electrical-optical transmitter 250 receives the combination of the switched electrical signals from the switching module 230 and the electrical signals from the overhead insertion module 240. The electrical-optical transmitter 250 converts the electrical signals into optical signals for transmission towards an optical switch in the optical transport network 120.

Figure 3:
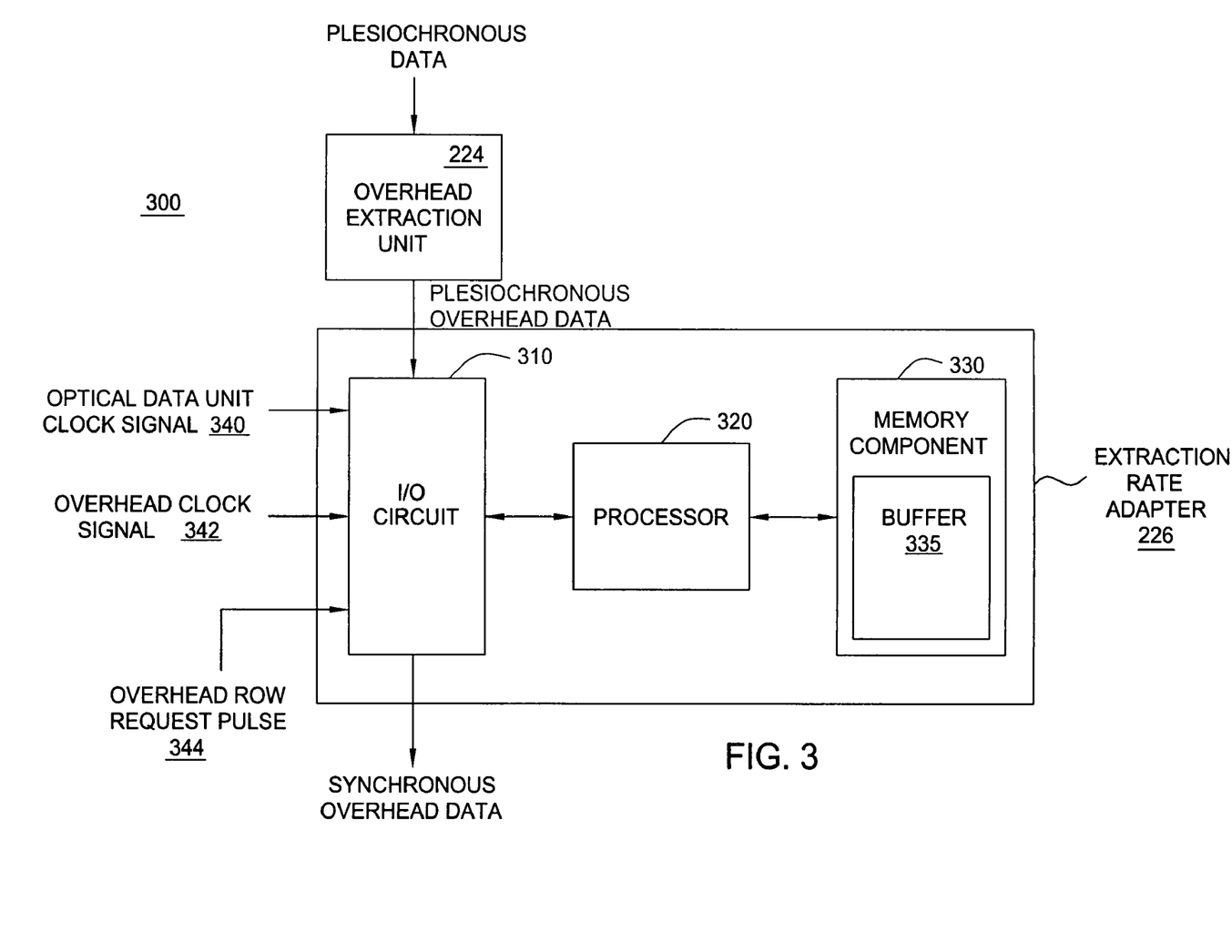
FIG. 3 depicts a high level block diagram of the overhead extraction unit and the extraction rate adapter of FIG. 2.

FIG. 3 depicts a high level block diagram of the overhead extraction unit 224 and the extraction rate adapter 226 of FIG. 2. As depicted in FIG. 3, and described hereinabove with respect to FIG. 2, the overhead extraction unit 224 receives plesiochronous data in the form of aligned data frames from the frame aligner 222 (not shown). The overhead extraction unit 224 extracts the overhead data portion of each aligned data frame and transmits the resulting plesiochronous overhead data packets (where an overhead data packet corresponds to one row of overhead data) to the extraction rate adapter 226 with plesiochronous timing.

The extraction rate adapter 226 of FIG. 3 comprises an input-output circuit 310, a processor 320, and a memory component 330 having a buffer 335. The input-output circuit 310 receives overhead data packets having plesiochronous timing from the overhead extraction unit 224. The input-output circuit 310 communicates with the processor 320 for the purposes of passing the plesiochronous overhead data to the processor 320. The processor 320 is coupled to the memory component 330 for the purposes of buffering the plesiochronous overhead data in the buffer 335. Although one buffer 335 is depicted in FIG. 3, a plurality of buffers may be used in order to perform the methods of the present invention.

As plesiochronous overhead data is received and buffered, corresponding optical data unit clock signal 340 and overhead clock signal 342 are received by the input-output circuit 310, and passed to processor 320 for processing. The processor 320 uses optical data unit clock signal 340 and overhead clock signal 342, as well as the buffer 335, in order to convert the plesiochronous overhead data into synchronous overhead data.

The processor 320 reads the overhead data from the memory component 330 and passes the overhead data to the input-output circuit 310 for synchronous transmission towards the internal overhead extraction processor 228. This occurs in response to an overhead row request pulse 344 received by the input-output circuit 310 from the internal overhead extraction processor 228. The result is a synchronous stream of overhead data packets transmitted from the input-output circuit 310 of the extraction rate adapter 226 to the internal overhead extraction processor 228.

As described hereinabove, in one embodiment, in which no additional overhead is data supported, the synchronous overhead data packets transmitted from the extraction rate adapter 226 are sixteen-byte overhead data packets. In this embodiment, the sixteen-byte overhead data packets comprise the same sixteen bytes of overhead information received by the extraction rate adapter 226.

In another embodiment, in which additional overhead data is supported, the overhead data packets transmitted from the extraction rate adapter 226 are eighteen-byte overhead data packets comprising the original sixteen bytes of overhead information received by the extraction rate adapter 226, as well as two additional overhead bytes. Since the two additional overhead bytes are implemented using the existing overhead access interface, no new external package pins are required to support the additional overhead functionality. Although described herein with respect to two additional overhead data bytes, fewer or more additional overhead data bytes may be used.

This embodiment is implemented by allocating additional bandwidth associated with each sixteen-byte overhead data packet, and prepending the additional bandwidth to the sixteen-byte overhead data packet. In this embodiment, processor 320 allocates a first additional bandwidth and a second additional bandwidth for each of the sixteen-byte overhead data packets received by the input-output circuit 310. The first additional bandwidth and the second additional bandwidth are allocated in memory component 330. The processor 320 then prepends the first additional bandwidth and the second additional bandwidth to the sixteen-byte overhead data packets, as depicted in FIG. 6.

Figure 7:
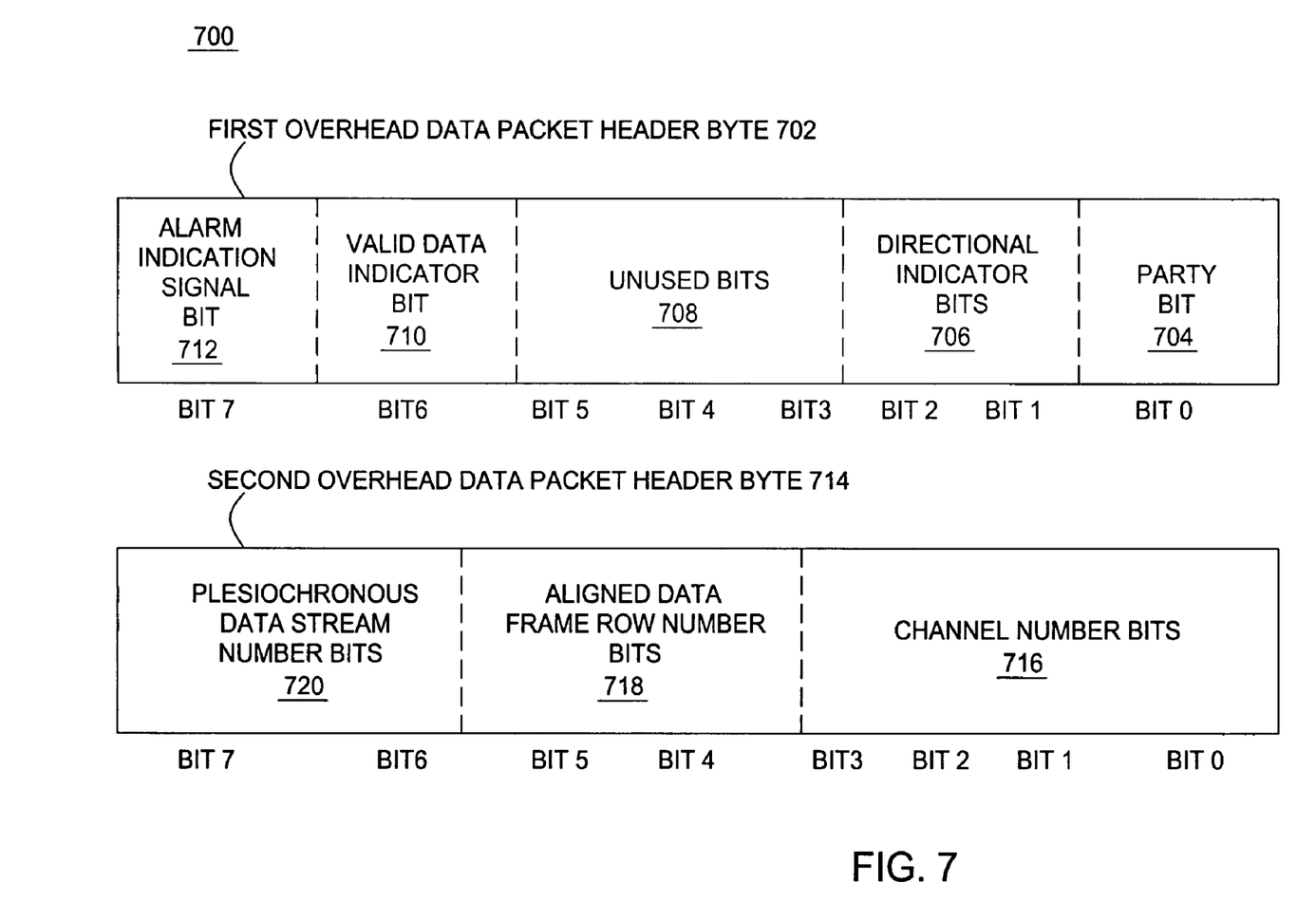
FIG. 7 depicts the data structure and contents of a first overhead data packet header byte and a second overhead data packet header byte.

The processor 320 inserts a first overhead data packet header byte in the first additional bandwidth and inserts a second overhead data packet header byte in the second additional bandwidth such that the synchronous overhead data packets transmitted from the extraction rate adapter 226 are eighteen-byte overhead data packets. The data structure and contents of the first overhead data packet header byte and the second overhead data packet header byte, which collectively operate as an overhead data packet header, are depicted in FIG. 7 and described in detail herein below.

In this embodiment, the input overhead data rate to extraction rate adapter 226 is lower than the output overhead data rate from extraction rate adapter 226. As such, it is necessary for the extraction rate adapter 226 to transmit empty packets in order to maintain the synchronous nature of the overhead data output from the extraction rate adapter 226. An empty packet is marked using one bit of the overhead data packet header.

In one embodiment, the extraction rate adapter 226 is optionally coupled to the external overhead extraction processor 260 via an external extraction interface 227. In this embodiment, the synchronous stream of overhead data packets transmitted from the input-output circuit 310 of the extraction rate adapter 226 to the internal overhead extraction processor 228 are transmitted to the external overhead extraction processor 260 for additional processing.

In one embodiment, in which one extraction rate adapter is used for each hierarchical layer of data (each layer of the optical transmission unit data, for example), the synchronous overhead data packets output from each of the extraction rate adapters are transmitted to a multiplexer. In this embodiment, each of the extraction rate adapters transmits a synchronous overhead data packet to the multiplexer in response to overhead row request pulse that is transmitted from the multiplexer to each of the extraction rate adapters. This overhead row request pulse is identical to the overhead row request pulse 344 described hereinabove.

The multiplexer receives synchronous overhead data packets from each of the extraction rate adapters, and corresponding overhead clock signals, as inputs. In this embodiment, the overhead clock signal is identical to the overhead clock signal 342 received by the extraction rate adapter 226 in the embodiment described above. The multiplexer then multiplexes the synchronous overhead data packets for transmission to the internal overhead extraction processor 228, and, optionally, to the external overhead extraction processor 260.

In the embodiment in which the multiplexed synchronous overhead data is transmitted to the external overhead extraction processor 260, the multiplexer transmits an extraction data frame pulse and an extraction overhead clock signal to the external overhead extraction processor 260. The extraction data frame pulse is used to indicate the start of a sequence of overhead packets. The extraction overhead clock signal is identical to the overhead clock signal 342 described hereinabove.

Figure 4:
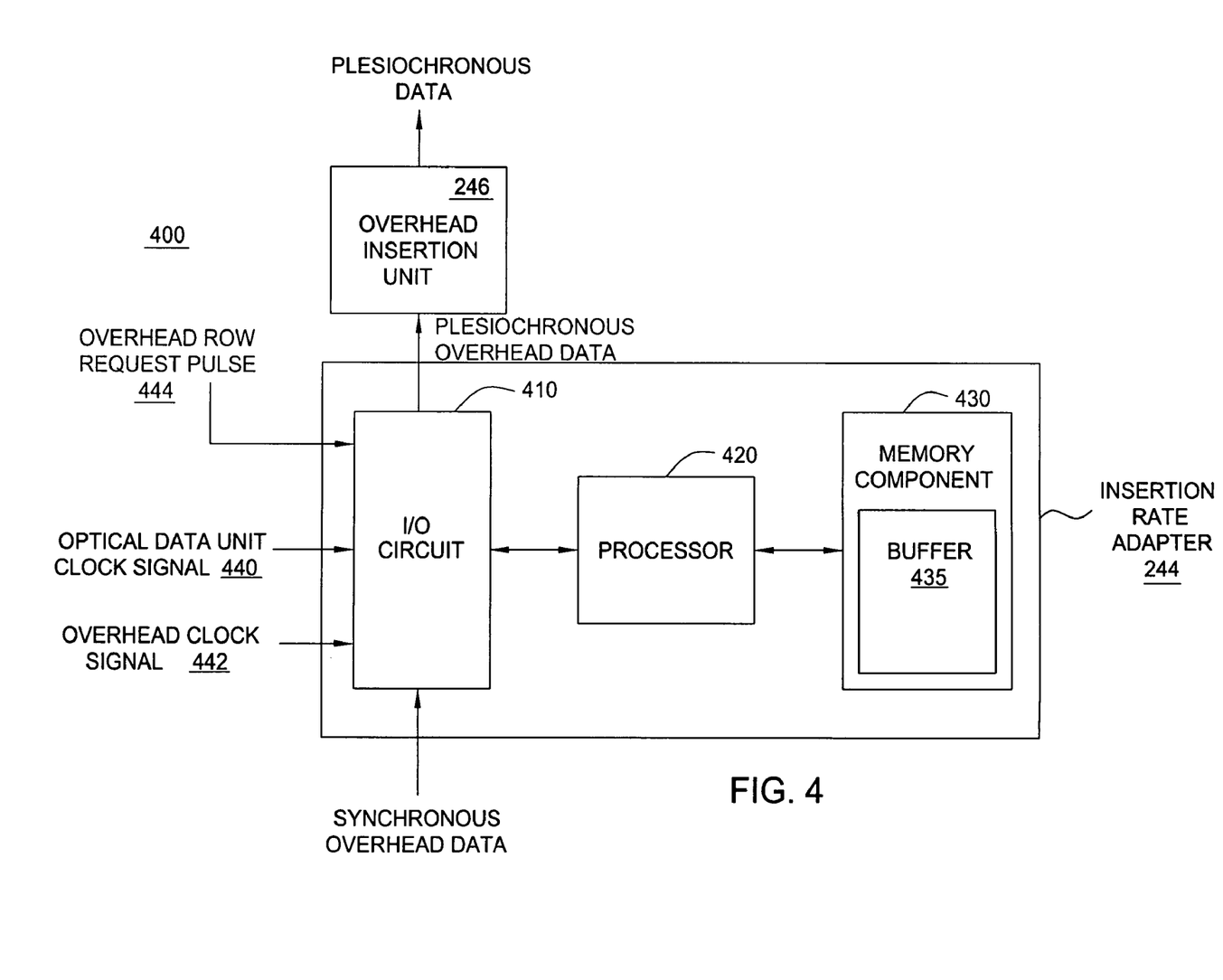
FIG. 4 depicts a high level block diagram of the insertion rate adapter and the overhead insertion unit of FIG. 2.

FIG. 4 depicts a high level block diagram of the insertion rate adapter 244 and overhead insertion unit 246 of FIG. 2. As depicted in FIG. 4, and described herein with respect to FIG. 2, insertion rate adapter 244 receives synchronous overhead data in the form of aligned data frames from the internal overhead insertion processor 242 (not shown).

The insertion rate adapter 244 comprises an input-output circuit 410, a processor 420, and a memory component 430 including a buffer 435. The input-output circuit 410 receives the overhead data packets having synchronous timing from the internal overhead insertion processor 242. The input-output circuit 410 communicates with the processor 420 for the purposes of passing synchronous overhead data to the processor 420. The processor 420 is coupled to the memory component 430 for the purposes of buffering the synchronous overhead data in buffer 435. Although one buffer 435 is depicted in FIG. 4, a plurality of buffers may be used in order to perform the methods of the present invention.

As synchronous overhead data is received and buffered, corresponding optical data unit clock signal 440 and overhead clock signal 442 are received by the input-output circuit 410, and passed to processor 420. The processor 420 uses the optical data unit clock signal 440 and the overhead clock signal 442, as well as the buffer 435, in order to convert the synchronous overhead data into plesiochronous overhead data.

The processor 420 reads the overhead data from the memory component 430 and passes the overhead data to the input-output circuit 410 for transmission towards the overhead insertion unit 246. This occurs in response to an overhead row request pulse 444 received by the input-output circuit 410 from the overhead insertion unit 246. The result is a plesiochronous stream of overhead data packets transmitted from the input-output circuit 410 of the insertion rate adapter 244 to the overhead insertion unit 246.

In one embodiment, the synchronous overhead data received by the insertion rate adapter 244 is received as sixteen-byte overhead data packets. In this embodiment, the plesiochronous overhead data packets transmitted from the insertion rate adapter 244 are sixteen-byte overhead data packets comprising the sixteen bytes of overhead data associated with each row of the overhead data portion of the aligned data frame as depicted in FIG. 5.

In another embodiment, the synchronous overhead data received by the insertion rate adapter 244 is received as eighteen-byte overhead data packets, where each eighteen-byte overhead data packet comprises the sixteen bytes of overhead data associated with each row of the overhead data portion of an aligned data frame, as well as two additional overhead bytes. The two additional overhead bytes, depicted in FIG. 6 and FIG. 7 and described in detail herein below, are used to provide additional monitoring and maintenance functionality. As mentioned above, since the two additional overhead bytes are implemented using the existing overhead access interface, no new external package pins are required to support the additional overhead functionality.

In this embodiment, the insertion rate adapter 244 removes a first overhead data packet header byte and a second overhead data packer header byte from each of the eighteen-byte overhead data packets. The processor 420 removes the first overhead data packet header byte and the second overhead data packet header byte from byte positions zero and one, respectively, of each eighteen-byte overhead data packet. The processor 420 then de-allocates the bandwidth from which the first overhead data byte header and second overhead data byte header are removed, resulting in a sixteen-byte overhead data packet.

Thus, the plesiochronous overhead data transmitted from the insertion rate adapter 244 to the overhead insertion unit 246 is transmitted as sixteen-byte overhead data packets. The data structure and contents of an overhead data packet are depicted in FIG. 6 and described in detail herein. The data structure and contents of a first overhead data packet header byte and a second overhead data packet header byte, which collectively operate as an overhead data packet header, are depicted in FIG. 7 and described in detail herein.

In one embodiment, the insertion rate adapter 244 is optionally coupled to an external overhead insertion processor 270 via external insertion interface 245. In this embodiment, the synchronous stream of overhead data packets received by the input-output circuit 410 of the insertion rate adapter 244 from the external overhead insertion processor 270 are processed by the insertion rate adapter 244 in order to convert the synchronous overhead data into plesiochronous overhead data.

In one embodiment, in which one insertion rate adapter is used for each hierarchical layer of the optical transmission unit data, the synchronous overhead data received by each of the insertion rate adapters are received from a de-multiplexer. In this embodiment, each of the insertion rate adapters receives a synchronous overhead data packet from the de-multiplexer in response to an overhead row request pulse that is transmitted from each insertion rate adapter to the de-multiplexer. This overhead row request pulse is identical to the overhead row request pulse 444 described hereinabove.

The de-multiplexer receives synchronous overhead data packets, and corresponding overhead clock signals, as inputs. In one embodiment, the de-multiplexer receives synchronous overhead data packets from the internal overhead insertion processor 242. In another embodiment, the de-multiplexer receives synchronous overhead data packets from the external overhead insertion processor 270.

The de-multiplexer transmits an insertion overhead packet request pulse, an insertion data frame pulse and an insertion overhead clock signal as outputs. In one embodiment, in which the synchronous overhead data received by the de-multiplexer is received from the external overhead insertion processor 270, the de-multiplexer transmits the insertion overhead packet request pulse and the insertion data frame pulse to the external overhead insertion processor 270.

In this embodiment, the insertion overhead packet request pulse is used to communicate whether a packet transmitted from the external overhead insertion processor 270 should contain valid data. An insertion overhead packet request pulse of "1" indicates that the next packet will contain valid overhead data. An insertion overhead packet request pulse of "0" indicates that the next packet will not contain valid data. The insertion data frame pulse is used to indicate the start of a sequence of overhead data packets.

In one embodiment, the processing required in order adapt external data received by the insertion rate adapter 244 from the external overhead insertion processor 270 is aligned to a Multi-Frame Alignment Signal (MFAS). In this embodiment, if the external overhead insertion processor 270 detects that there is a row of data to be inserted (an overhead data packet), the internal MFAS of insertion rate adapter 244 and the external MFAS of overhead insertion processor 270 are compared.

If the compared internal MFAS and external MFAS signals are equal, overhead insertion operated normally as described herein. If the compared internal MFAS and external MFAS signals are not equal, the insertion overhead packet request pulse is held to "0", thereby preventing overhead insertion processor 270 from sending overhead data packet bytes. Similarly, insertion rate adapter 244 waits for an indication that the internal MFAS and external MFAS are equal prior to inserting the external overhead data into the multiplexed hierarchical layered data signal. In another embodiment, the same overhead data packet may be inserted repeatedly until the internal MFAS and external MFAS are equal.

In one embodiment, described hereinabove with respect to the extraction rate adapter 226 of FIG. 3 and the insertion rate adapter 244 of FIG. 4, there is no direct connection between the external extraction interface 227 of extraction rate adapter 226 and the external insertion interface 245 of insertion rate adapter 244. As such, in this embodiment, there is no sharing of overhead data between the external overhead extraction processor 260 and external overhead insertion processor 270.

In another embodiment, there is a direct connection between the external extraction interface 227 of extraction rate adapter 226 and the external insertion interface 245 of insertion rate adapter 244. The configuration of this embodiment is used to insert overhead bytes from the external extraction interface 227 directly into the external insertion interface 245.

In this embodiment, the synchronous overhead data output from the external extraction interface 227 of extraction rate adapter 226 is transmitted directly to the external insertion interface 245 of the insertion rate adapter 244. Similarly, the external insertion data frame pulse output from the external insertion interface 245 is transmitted directly to the external extraction interface 227 of the extraction rate adapter 226. The remaining input and output signals of both external extraction interface 227 and external insertion interface 245 are generated and transmitted as described hereinabove with respect to the embodiments of FIG. 3 and FIG. 4.

In still another embodiment, there is a partial connection between the external extraction interface 227 of extraction rate adapter 226 and the external insertion interface 245 of insertion rate adapter 244. The configuration of this embodiment is used to insert at least a portion of the overhead bytes from the external extraction interface 227 into the external insertion interface 245.

In this embodiment, the synchronous overhead data output from the external extraction interface 227 of the extraction rate adapter 226 is transmitted to the external overhead extraction processor 260 and as input to the external insertion interface 245 of the insertion rate adapter 244. Similarly, the external insertion data frame pulse is transmitted to both the external overhead insertion processor 270 and as input to the external extraction interface 227 of the extraction rate adapter 226. The remaining input and output signals of both the external extraction interface 227 and the external insertion interface 245 are generated and transmitted as described hereinabove with respect to the embodiments of FIG. 3 and FIG. 4.

FIG. 5 depicts the data structure and contents of an aligned data frame as provided on the output of the frame aligner 222 and provided on the input of the frame processor 248. The aligned data frame 500 of FIG. 5 comprises 16,320 bytes of data aligned in four rows, wherein each of the four rows has four thousand eighty associated columns. Specifically, the aligned data frame 500 of FIG. 5 comprises an overhead data portion 502 and a payload data portion 504. In one embodiment, although not depicted, the aligned data frame 500 may also comprise a forward error correction (FEC) portion. The overhead data portion 502 comprises 64 bytes occupying columns 1-16 of rows 1-4 in the aligned data frame 500. The payload data portion 504 comprises 15,232 bytes occupying columns 17-3824 of rows 1-4 in the aligned data frame 500.

Although the aligned data frame 500 is depicted as a 4-row by 4080-column rectangle, the methodology of the present invention can readily be applied to aligned data frames containing fewer or more bytes, and to data frames having different dimensions. Furthermore, it is well known in the art that the payload data portion 504 may begin anywhere in the aligned data frame 500, and may span other aligned data frames (not shown). In this embodiment, the start of the payload data portion 504 is indicated by a pointer in the overhead data portion 502, and a multi-frame assignment signal is required in order to perform the frame alignment as provided by the frame aligner 222.

With respect to overhead extraction, as described hereinabove, each row of the overhead data portion 502 is extracted from the aligned data frame 500 by the overhead extraction unit 224 to form a sixteen-byte overhead data packet. The sixteen-byte overhead data packet is provided on the output of the overhead extraction unit 224, and, optionally, on the output of the extraction rate adapter 226 if no additional overhead data bytes are added to the existing optical channel overhead data.

With respect to overhead insertion, as described above, each sixteen-byte overhead data packet is inserted into a row of the overhead data portion 502 of the aligned data frame 500 by the overhead insertion unit 246. The sixteen-byte overhead data packet is provided on the output of the insertion rate adapter 244, and, optionally, on the output of the internal overhead insertion processor 242 if no additional overhead data bytes were prepended to the existing optical channel overhead data.

FIG. 6 depicts the data structure and contents of an overhead data packet. In one embodiment, the overhead data packet 600 comprises one sixteen-byte row of the overhead data portion 502 of the aligned data frame 500 depicted in FIG. 5. In this embodiment, the overhead data packet 600 comprises sixteen bytes of overhead data, corresponding to the sixteen columns of the overhead data portion 502 for that particular row. This embodiment corresponds to the overhead data packet provided on the output of the overhead extraction unit 224, and provided on the output of the insertion rate adapter 244, as described hereinabove.

In another embodiment, overhead data packet 600 comprises eighteen bytes of overhead data, corresponding to one sixteen-byte row of the overhead data portion 502 of the aligned data frame 500, and two additional overhead data packet bytes. This embodiment corresponds to the overhead data packets provided on the output of the extraction rate adapter 226, and provided on the input of the insertion rate adapter 244, as described hereinabove. In this embodiment, the first of the two additional overhead data packet bytes is a first overhead data packet header byte, and the second of the two additional overhead data packet bytes is a second overhead data packet header byte. Although described herein with respect to two additional overhead data packet bytes, fewer or more additional overhead data packet bytes may be used.

With respect to extraction, the first overhead data packet header byte and the second overhead data packet header byte are prepended to the sixteen-byte overhead data packet by the extraction rate adapter 226 in order to form an eighteen-byte overhead data packet.

As described hereinabove with respect to FIG. 3, the processor 320 of the extraction rate adapter 226 allocates a first additional bandwidth and allocates a second additional bandwidth in memory component 330. The processor 320 prepends append the second additional bandwidth to the sixteen-byte overhead data packet, and prepends the first additional bandwidth to the second additional bandwidth. The processor 320 then inserts the first overhead data packet header byte in the first additional bandwidth and inserts the second overhead data packet header byte in the second additional bandwidth, forming therefrom the eighteen-byte overhead data packet as depicted in FIG. 6.

With respect to insertion, the first overhead data packet header byte and the second overhead data packet header byte are removed from the eighteen-byte overhead data packet by the insertion rate adapter 244 in order to form the sixteen-byte overhead data packet.

As described herein with respect to FIG. 4, processor 420 of insertion rate adapter 244 removes the first overhead data packet header byte from the first additional bandwidth and removes the second overhead data packet header byte from the second additional bandwidth. The processor 420 then de-allocates the first additional bandwidth and the second additional bandwidth from the eighteen-byte overhead data packet, forming therefrom the sixteen-byte overhead data packet as depicted in FIG. 6.

FIG. 7 depicts the data structure and contents of a first overhead data packet header byte and a second overhead data packet header byte of the eighteen-byte embodiment of the overhead data packet 600 of FIG. 6. The first overhead data packet header byte 702 comprises a parity bit 704 (bit 0), two directional indicator bits 706 (bits 1-2), three unused bits 708 (bits 3-5), a valid data indicator bit 710 (bit 6) and an alarm indication signal bit 712 (bit 7). The second overhead data packet header byte 714 comprises four channel number bits 716 (bits 0-3), two aligned data frame row number bits 718 (bits 4-5) and two plesiochronous data stream number bits 720 (bits 6-7).

With respect to extraction, as described hereinabove with respect to FIG. 3 and FIG. 6, the first overhead data packet header byte 702 and the second overhead data packet header byte 714 are prepended to the sixteen-byte overhead data packet 600 by the processor 320 of extraction rate adapter 226. With respect to insertion, as described hereinabove with respect to FIG. 4 and FIG. 6, the first overhead data packet header byte 702 and the second overhead data packet header byte 714 are removed from the eighteen-byte overhead data packet 600 by the processor 420 of insertion rate adapter 244.

Although described as comprising sixteen bytes (without overhead data packet header bytes), an overhead data packet may contain fewer or more than sixteen bytes. Similarly, although depicted and described as comprising two overhead data packet header bytes, fewer or more overhead data packet header bytes may be used. As such, for overhead extraction, the scope of the present invention is not limited to the embodiment in which two overhead data packet header bytes are prepended to a sixteen byte overhead data packet. Similarly, for overhead insertion, the scope of the present invention is not limited to the embodiment in which two overhead data packet header bytes are removed from an eighteen byte overhead data packet.

Although the contents of the first overhead data packet header byte 702 and the second overhead data packet header byte 704 are explicitly defined with respect to FIG. 7, the additional bandwidth occupied by the first overhead data packet header byte 702 and the second overhead data packet header byte 704 may be used to provide any functionality suitable for implementation using overhead data. Furthermore, although two overhead data packet header bytes are described herein, in one embodiment, additional overhead data packet header bytes may be utilized in order to provide additional functionality (e.g., error correction of packet bytes, signaling functions, and the like).

Since the first overhead data packet header byte 702 and the second overhead data packet header byte 714 are implemented using existing data interfaces, no additional external device pins are required in order to support the additional functionality provided by the overhead data packet header bytes. Thus, additional monitoring, maintenance and other functionality is supported without a significant increase in device package costs.

For simplicity and clarity of exposition, only one direction of transmission is shown and described herein; however, it will be apparent to those skilled in the art that the transmission of optical signals in a practical transport network may require bidirectional transmission, and therefore overhead access may be required in both directions.

Although various embodiments which incorporate the teachings of the present invention have been shown and described in detail herein, those skilled in the art can readily devise many other varied embodiments that still incorporate these teachings.

What is claimed is:

1. A method of adapting plesiochronous hierarchical layered data to produce synchronous hierarchical layered data, comprising:

buffering plesiochronous data comprising a plurality of hierarchical layers; and applying at least one clock signal to said plurality of hierarchical layers of said buffered plesiochronous data for producing said synchronous hierarchical layered data;

wherein said plesiochronous hierarchical layered data and said synchronous hierarchical layered data comprise at least one overhead data packet; and the method further comprises:

allocating a first additional byte of memory space;

allocating a second additional byte of memory space; and prepending said first additional byte and said second additional byte to said at least one overhead data packet.

2. The method of claim 1, wherein said buffering is performed according to a data rate associated with each of said hierarchical layers.

3. The method of claim 1, further comprising:
transmitting at least a portion of said synchronous hierarchical layered data towards an external device for processing.

4. The method of claim 1, further comprising:
inserting a first overhead data packet header byte in said first additional byte of memory space; and
inserting a second overhead data packet header byte in said second additional byte of memory space.

5. The method of claim 4, wherein said first overhead data packet header byte comprises a parity bit, two directional indicator bits, three unused bits, a valid data indicator bit and an alarm indication signal bit, and said second overhead data packet header byte comprises four channel number bits, two aligned data frame row number bits and two plesiochronous data stream number bits.

6. An apparatus for adapting plesiochronous hierarchical layered data to produce synchronous hierarchical layered data, comprising:

a memory component operable to buffer plesiochronous data, said plesiochronous data having a plurality of hierarchical layers; and a processor coupled to said memory component for applying at least one clock signal to said plurality of hierarchical layers, said at least one clock signal operable to read said plesiochronous data from said memory component as substantially synchronous hierarchical layered data;

wherein said plesiochronous hierarchical layered data and said synchronous hierarchical layered data comprise at least one overhead data packet; and wherein said processor allocates a first additional byte of memory space and a second additional byte of memory space in said memory component, wherein said first additional byte and said second additional byte are prepended to said overhead data packet.

7. The apparatus of claim 6, further comprising:
an input-output circuit, said input-output circuit operable to receive said plesiochronous hierarchical layered data from an overhead extraction unit.

8. The apparatus of claim 6, wherein said processor initiates transmission of said synchronous hierarchical layered data towards an overhead processing device.

9. The apparatus of claim 8, wherein said processor initiates transmission of said synchronous hierarchical layered data in response to an overhead row request pulse received by said processor from said overhead processing device.

10. The apparatus of claim 6, wherein said processor inserts a first overhead data packet header byte in said first additional byte of memory space and inserts a second overhead data packet header byte in said second additional byte of memory space.

11. The apparatus of claim 10, wherein said first overhead data packet header byte comprises a parity bit, two directional indicator bits, three unused bits, a valid data indicator bit and an alarm indication signal bit, and said second overhead data packet header byte comprises four channel number bits, two aligned data frame row number bits and two plesiochronous data stream number bits.

12. The apparatus of claim 11, wherein said valid data indicator bit and said two aligned data frame row number bits are received from an overhead extraction unit.

13. A method of adapting synchronous hierarchical layered data to produce plesiochronous hierarchical layered data, comprising:

buffering synchronous data comprising a plurality of hierarchical layers; and applying at least one clock signal to said plurality of hierarchical layers of said buffered synchronous data for producing said plesiochronous hierarchical layered data;

wherein said synchronous hierarchical layered data and said plesiochronous hierarchical layered data comprise at least one overhead data packet; and the method further comprises:

identifying a first overhead data packet header byte;

identifying a second overhead data packet header byte; and removing said first overhead data packet header byte and said second overhead data packet header byte from said at least one overhead data packet.

14. The method of claim 13, wherein said first overhead data packet header byte comprises a parity bit, two directional indicator bits, three unused bits, a valid data indicator bit and an alarm indication signal bit, and said second overhead data packet header byte comprises four channel number bits, two aligned data frame row number bits and two plesiochronous data stream number bits.

15. An apparatus for adapting synchronous hierarchical layered data to produce plesiochronous hierarchical layered data, comprising:

a memory component operable to buffer synchronous data, said synchronous data having a plurality of hierarchical layers; and a processor coupled to said memory component for applying at least one clock signal to said plurality of hierarchical layers, said at least one clock signal operable to read said synchronous data from said memory component as plesiochronous hierarchical layered data;

wherein said synchronous hierarchical layered data and said plesiochronous hierarchical layered data comprise at least one overhead data packet; and wherein said processor identifies a first overhead data packet header byte and a second overhead data packet header byte, and removes said first overhead data packet header byte and said second overhead data packet header byte from said overhead data packet.

16. The apparatus of claim 15, further comprising:
an input-output circuit, said input-output circuit operable to receive said synchronous hierarchical layered data from an overhead processing device.

17. The apparatus of claim 16, wherein said input-output circuit receives said synchronous hierarchical layered data from said overhead processing device in response to an overhead row request pulse transmitted towards said overhead processing device by said processor.

18. The apparatus of claim 16, wherein said input-output circuit receives said synchronous hierarchical layered data from said overhead processing device in response to at least one Multi-Frame Assignment Signal (MFAS).

19. The apparatus of claim 15, wherein said processor initiates transmission of said plesiochronous hierarchical layered data towards an overhead insertion unit.

20. The apparatus of claim 19, wherein said processor initiates transmission of said plesiochronous hierarchical layered data in response to an overhead row request pulse received by said processor.

21. The apparatus of claim 15, wherein said first overhead data packet header byte comprises a parity bit, two directional indicator bits, three unused bits, a valid data indicator bit and an alarm indication signal bit, and said second overhead data packet header byte comprises four channel number bits, two aligned data frame row number bits and two plesiochronous data stream number bits.

* * * * *